Aug. 18, 1959  B. A. PARR  2,900,000
LOCK NUT HAVING A SPLIT PLASTIC COLLAR AND METHOD
OF ASSEMBLING SAME
Filed June 16, 1951

Inventor
B. A. PARR
By
Wilkinson + Mawhinney
Attorney

United States Patent Office 2,900,000
Patented Aug. 18, 1959

2,900,000

LOCK NUT HAVING A SPLIT PLASTIC COLLAR AND METHOD OF ASSEMBLING SAME

Bernard Arthur Parr, Kensington, London, England

Application June 16, 1951, Serial No. 231,923

4 Claims. (Cl. 151—7)

This invention relates to so-called "elastic stop nuts," that is, self-locking nuts, this term including other internally threaded bodies, having an internal annular recess containing an annular body of "elastic" material so dimensioned as to extend inwardly of the bottom roots of the threads of the nut, whereby the co-operating bolt or threaded rod impresses a thread into the elastic material, compresses it into the recess and is frictionally gripped thereby, thus locking the nut on the bolt or rod.

The material of the "elastic" annular body of a stop nut, hereinafter referred to as a collar or insert, should be deformable both plastically and elastically. Formerly a fibre substance was employed, but this was not wholly satisfactory owing mainly to its being hygroscopic. Subsequently synthetic materials of the kind typified by the product commercially known as nylon were found to possess desirable qualities for this application in a high degree and it is preferred to use material of this kind.

For certain applications of the present invention, in which the nut is not required to withstand high temperatures, polyvinyl-chloride compounds or compositions may be used for the collar or insert.

The usual practice in fabricating and assembling elastic stop nuts is to counterbore the nut to form the recess, insert the collar and complete the closure of the recess by spinning or pressing over the proud rim of the recess to trap the collar. This practice is followed in carrying out the present invention.

Hitherto, elastic collars or inserts have been fabricated by moulding, which is a relatively costly process.

Good fit of the "elastic" collar in the recess is essential to ensure that the collar does not rotate in the nut. If the collar can rotate the threads of the co-operating element when screwed into the stop nut tend to shear the elastic collar rather than impress a thread into it, and thus reduce or destroy the efficacy of the collar to lock the nut. If the thread of the co-operating element has succeeded in impressing a thread in the elastic collar, and the latter subsequently tends to rotate in its recess, the collar will prevent the nut from working itself off altogether, but will allow it to slack-off enough to prevent the transmission of tensile loads and to permit vibration.

Moulded collars or inserts of "plastic" compositions, including the class of composition commonly known as "Nylon," are subject to very little dimensional variation when produced in quantity; and this calls for equally close tolerances on the dimensions of the recess of the metal body into which they are to be inserted, in order to obtain the required close fit, without incurring an unacceptable proportion of wasters, it being impossible to assemble such collars with an interference fit without ruining the collar. Fibre collars are less subject to this disadvantage, a generous interference fit being acceptable for these, but fibre collars are unsatisfactory for the reasons stated above.

The present invention is distinguished by the feature that the collar or insert is constituted by one or more separate, single coils of strip material with the ends of each coil abutting or separated by a small gap, the section of the strip being preferably rectangular.

Such strip material can be formed by extrusion; and this enables the collars to be fabricated much more cheaply than by the moulding process. Moreover, a collar formed of a coil of strip material can adapt itself to the recess of a nut and therefore permits of much wider tolerances on the dimensions of the recess than would be acceptable with moulded collars of "plastic" material, thus affording a marked further gain in economy of manufacture.

For stop nuts, the abutting ends of the coil of strip material of which the collar is formed are preferably inclined obliquely to the plane perpendicular to the axis of the nut. When the closure is completed by swaging the free outer edge of the rim of the recess over the collar, the latter is compressed axially, and this sets up a wedging action between the inclined abutting faces causing the collar to expand radially and thereby ensuring a powerful frictional engagement between the collar and the outer (circumferential) wall of the recess.

According to a further feature of the invention the strip material from which the collar is formed is internally reinforced by a metal wire disposed longitudinally of the strip.

If the strip is formed by extrusion the reinforcement can easily be inserted during the extrusion process by feeding the reinforcing wire through the extrusion nozzle concurrently with the extrusion of the material of the strip.

The invention also includes an improved method of fabricating and assembling stop nuts, which comprises the steps of coiling extruded strip material into a helix, the pitch of which is preferably about twice the thickness of the strip in the axial direction of the helix, inserting the terminal coil of the helix into the recess of a nut, cutting off the terminal coil in situ, pressing it down into the recess and finally completing the closure by swaging the outer free edge of the standing rim of the recess over the pressed down coil in any convenient way, e.g. by spinning or pressing. This method lends itself to a continuous process in which the helix is fed forward intermittently and the last four of the above-mentioned steps are performed repetitively.

The strip may be knurled concurrently with coiling it into a helix.

The internal reinforcement of the strip material with a longitudinal wire is an important factor in the performance of this method, because the unreinforced extruded strip material, especially in the case of nylon and other "plastic" compositions, such as polyvinyl chloride, will not when coiled into a helix, in general retain its shape, but tends almost immediately to uncoil itself, so that it is very difficult to form a helix which will be of the required diameter when fed to the nuts. However, the presence of the internal reinforcement overcomes the above-mentioned tendency to uncoil so that the strip can be coiled into a helix of the required diameter which will remain substantially unaltered as the helix is fed to the nuts, or during storage or/and handling if required in case it is more convenient to separate in space or/and time the operations forming the helix and of feeding it to the nuts and cutting off the terminal coil in situ.

Figure 5:
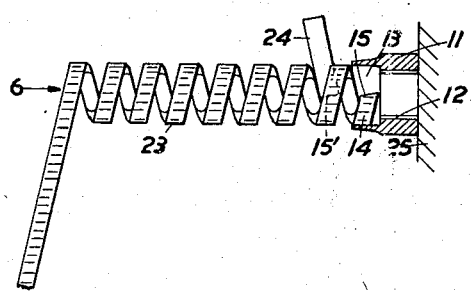
Figure 6:
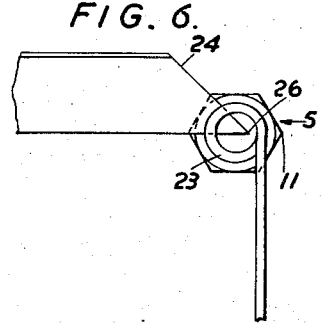

Figures 5 and 6 illustrate schematically the method of forming the "elastic" collar in situ by cutting off the end coil of a helix of strip material, Figure 5 being a view in the direction of the arrow 5 of Figure 6 and Figure 6 a view in the direction of the arrow 6 of Figure 5.

Figure 1:
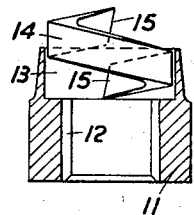
Figures 1 to 3 illustrate three stages in the manufacture of a self-locking nut according to the invention, the nut being shown in axial section.
Figure 2:
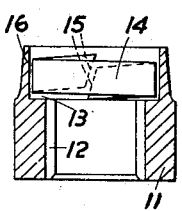
Figure 3:
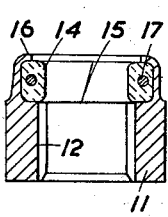

In Figures 1 to 3 a nut 11 is formed with a threaded bore 12 at one end and an enlarged cylindrical recess or counterbore 13 at the other end. A collar 14 formed of a single coil of strip material of rectangular cross-section internally reinforced by a longitudinally disposed steel wire 17 is inserted into the other end and forms a locking washer. The inner face of this collar extends inwardly of the bottom of the threads 12 (see Figure 3).

Initially, the collar 14 forms one coil of an open helix. This is inserted in the recess 13 (Figure 1). It is then pressed down into the recess 13 (Figure 2) when the ends 15 of the coil, which are cut off obliquely with respect to the axis of the nut, meet or cam together as shown in Figure 3. The rim 16 of the recess 13 then extends above the collar 14 (Figure 2) and is finally swaged over, as shown in Figure 3, to retain the collar in the recess. The axial pressure exerted on the collar in this process causes the oblique abutting faces 15 to exert a wedging or camming action tending to expand or spread the collar and seat it tightly against the sides of the recess.

Figure 4:
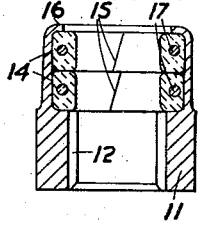
Figure 4 is a view similar to Figure 3 of a modified nut.

The modified nut of Figure 4 differs from that of Figures 1 to 3 in having the collar 14 formed of two superimposed, separate, single coils of the reinforced strip material, the other reference numerals in this figure indicating similar parts and features to those so designated in Figure 3.

Figure 5 shows a continuous strip of material 23 of rectangular section coiled into a helix, of which the end is inserted into the recess 13 of the nut 11, held by means (not shown) against an abutment schematically indicated at 25. The terminal coil of this helix is then cut off by movement (from left to right in Figure 6) of a knife 24 which is inclined so as to pass between the coils of the helix on the side opposite to the point where severing takes place. The cutting edge 26 of the knife, being perpendicular to the sides of the knife, severs the terminal coil of the helix along the line 15' oblique to the axis of the helix. The similarly oblique line 15 marks the end of the terminal coil cut off by the preceding stroke of the knife.

The outer face of the helix 23 is knurled (see Figure 5) to give better adhesion between the collar 14 and the walls of the recess 13.

The continuous rectangular section strip 23 of nylon or a polyvinyl-chloride composition is produced by extrusion in a conventional extrusion press, the reinforcing wire 17 (not shown in Figures 5 and 6) being fed through the extrusion nozzle concurrently with the plastic material. After extrusion the strip is coiled into the helix, which will retain its shape, subject to a small amount of spring-back, owing to the presence of the reinforcing wire.

I claim:

1. The herein described method of assembling a recessed nut and a deformable split collar comprising the steps of coiling extruded deformable strip material into a helix, cutting the free end of one of the terminal coils of the helix on a line which is oblique to the axis of the nut, inserting the obliquely cut free end portion of said terminal coil of the helix into the recess of the nut, cutting off the terminal coil in situ in the recess obliquely to the axis of the nut to provide a collar having a second oblique end complemental to the first end, exerting a pressure on said collar axially of the nut by swaging the wall of the recess of the nut over on the collar to cam the ends together to cause circumferential expansion of the collar against the wall of the recess.

2. A nut lock comprising a nut having a threaded bore and a counter bore with a radial shoulder between said bore and counter bore, a plastic split collar positioned within said counter bore and having its inner face seated upon said shoulder and comprising a pair of substantially semicircular portions each having a free end provided with a cam face, the opposite ends of said collar portions being joined together, and means preventing rotation of said collar in said counter bore cooperating with said radial shoulder for placing and maintaining said collar portions under pressure substantially parallel to the longitudinal axis of the collar whereby the material of said collar portions is radially displaced outwardly and inwardly to effect a tight frictional engagement between the outer faces of the side walls of the said collar portions and the inner face of the counter bore of the nut, to cause a part of said collar portions to project slightly into the bore of the nut and to bring the cam faces of said free ends of the collar portions into abutting camming engagement to cause radially outward movement of translation of said collar portions to augment the frictional engagement between the outer faces of the side walls of the collar portions and the inner face of the counter bore of the nut and to maintain said collar portions in their outwardly moved positions of translation regardless of the vibrations induced in the device during its use.

3. A nut lock comprising a nut having a body provided with a threaded bore and a wall extending from the body and having a counter bore with a radial shoulder between said bore and counter bore, a plastic deformable split collar positioned within said counter bore and having its inner face seated upon said shoulder and comprising a pair of substantially semicircular portions each having a free end provided with a cam face, the opposite ends of said collar portions being joined together, and means preventing rotation of said collar in said counter bore comprising a swaged down portion of said wall engaging the outer face of said collar cooperating with said radial shoulder for placing and maintaining said collar portions under pressure substantially parallel to the longitudinal axis of the collar whereby said collar portions are radially outwardly and inwardly moved to effect a tight frictional engagement between the outer faces of the side walls of the said collar portions and the inner face of the counter bore of the nut, to cause a part of said collar portions to project slightly into the bore of the nut and to bring the cam faces of said free ends of the collar portions into abutting camming engagement to cause radially outward movement of translation of said collar portions to augment the frictional engagement between the outer faces of the side walls of the collar portions and the inner face of the counter bore of the unit and to maintain said collar portions in their outwardly moved positions of translation regardless of the vibrations induced in the device during its use.

4. The herein described method of assembling a recessed nut having a bore therethrough and a deformable splite collar having inner and outer radially facing side walls comprising the steps of coiling extruded deformable strip material into a helix, cutting the free end of one of the terminal coils of the helix on a line which is oblique to the axis of the nut, inserting the obliquely cut free end portion of said terminal coil of the helix into the recess of the nut, cutting off the terminal coil in situ in the recess obliquely to the axis of the nut to provide a collar having a second oblique end complemental to the first end, forcing the oblique ends into substantially axially sliding engagement with one another to effect a camming action therebetween to cause outward radial movement of translation of the collar to bring its outer radially facing side wall against the recess wall, and effecting radial displacement of the material of the collar to cause the outer radially facing side wall to engage frictionally against the recess wall to prevent rotation of the collar and to cause the inner radially facing side wall of the collar to project into the nut bore.

References Cited in the file of this patent

UNITED STATES PATENTS

| | | |
|---|---|---|
| 262,193 | Wootten | Aug. 1, 1882 |
| 644,172 | Harvey | Feb. 27, 1900 |
| 648,687 | Garlock | May 1, 1900 |
| 1,514,192 | Bausman | Nov. 4, 1924 |
| 1,861,889 | Stoll | June 7, 1932 |
| 1,958,180 | Brackett | May 8, 1934 |
| 2,159,866 | Simmonds | May 23, 1939 |
| 2,306,806 | Hoopes | Dec. 29, 1942 |
| 2,358,707 | Haas | Sept. 19, 1944 |
| 2,365,380 | Bloomfield | Dec. 19, 1944 |
| 2,393,323 | Hungerford | Jan. 22, 1946 |
| 2,399,639 | Kelly | May 7, 1946 |
| 2,439,687 | Findley | Apr. 13, 1948 |
| 2,450,694 | Sauer | Oct. 5, 1948 |
| 2,588,372 | Erb | Mar. 11, 1952 |

FOREIGN PATENTS

| | | |
|---|---|---|
| 4,405 | Great Britain | Nov. 14, 1876 |
| 608,067 | France | Apr. 10, 1926 |
| 358,825 | Italy | May 2, 1938 |

UNITED STATES PATENT OFFICE

CERTIFICATE OF CORRECTION

Patent No. 2,900,000                                                       August 18, 1959

Bernard Arthur Parr

It is hereby certified that error appears in the above numbered patent requiring correction and that the said Letters Patent should read as corrected below.

In the heading to the printed specification, between lines 5 and 6, insert -- Claims priority, application Great Britain June 19, 1950 --.

Signed and sealed this 12th day of April 1960.

(SEAL)
Attest:

KARL H. AXLINE                                                                ROBERT C. WATSON
Attesting Officer                                                    Commissioner of Patents